2 Sheets—Sheet 1.

J. J. & H. F. MANN.

HARVESTER.

No. 4,281. Reissued Feb. 28, 1871.

Witnesses.
A. B. Stoughton,
Edmund Masson

Jacob J. Mann, by his assignee Henry F. Mann
Henry F. Mann

J. J. & H. F. MANN.

HARVESTER.

No. 4,281. Reissued Feb. 28, 1871.

United States Patent Office.

HENRY F. MANN, OF PITTSBURG, PENNSYLVANIA, FOR HIMSELF AND AS ASSIGNEE OF JACOB J. MANN.

Letters Patent No. 15,044, dated June 3, 1856, extended seven years; reissue No. 4,281, dated February 28, 1871.

IMPROVEMENT IN HARVESTERS.

The Schedule referred to in these Letters Patent and making part of the same.

*To all whom it may concern:*

Be it known that JACOB J. MANN, formerly of Westville, in the county of Laporte and State of Indiana, (now deceased,) and HENRY F. MANN, formerly of Westville, in the county of Laporte and State of Indiana, but now of Pittsburg, in the county of Allegheny and State of Pennsylvania, did invent certain new and useful Improvements in Reaping-Machines; and that the following is a full, clear, and exact description of the same, reference being had to the accompanying drawing making a part of this specification, in which—

Like letters of reference indicate like parts in each figure.

Figure 1:
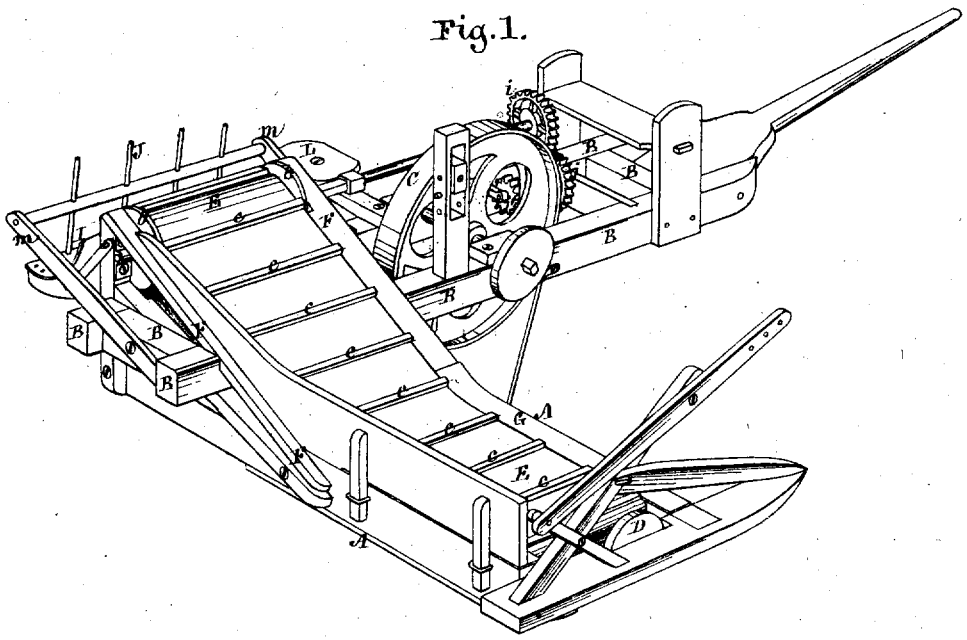
Figure 1 represents, in perspective, a view of the machine taken from the rear thereof.
Figure 2:
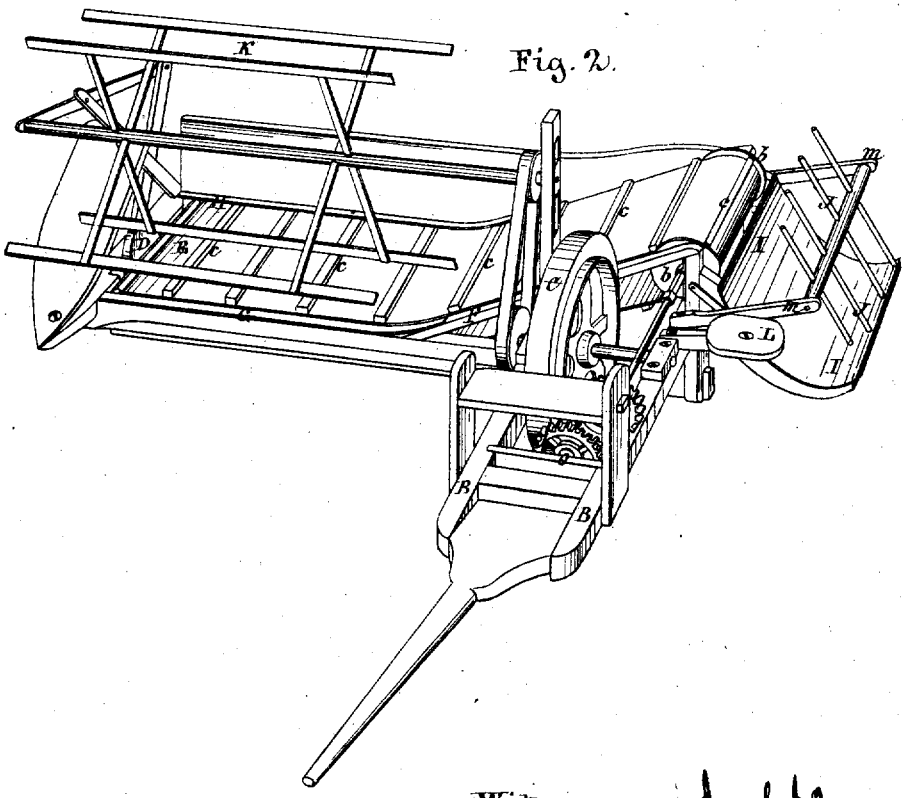
Figure 2 represents, in perspective, a view of the same taken from the front thereof.
Figure 3:
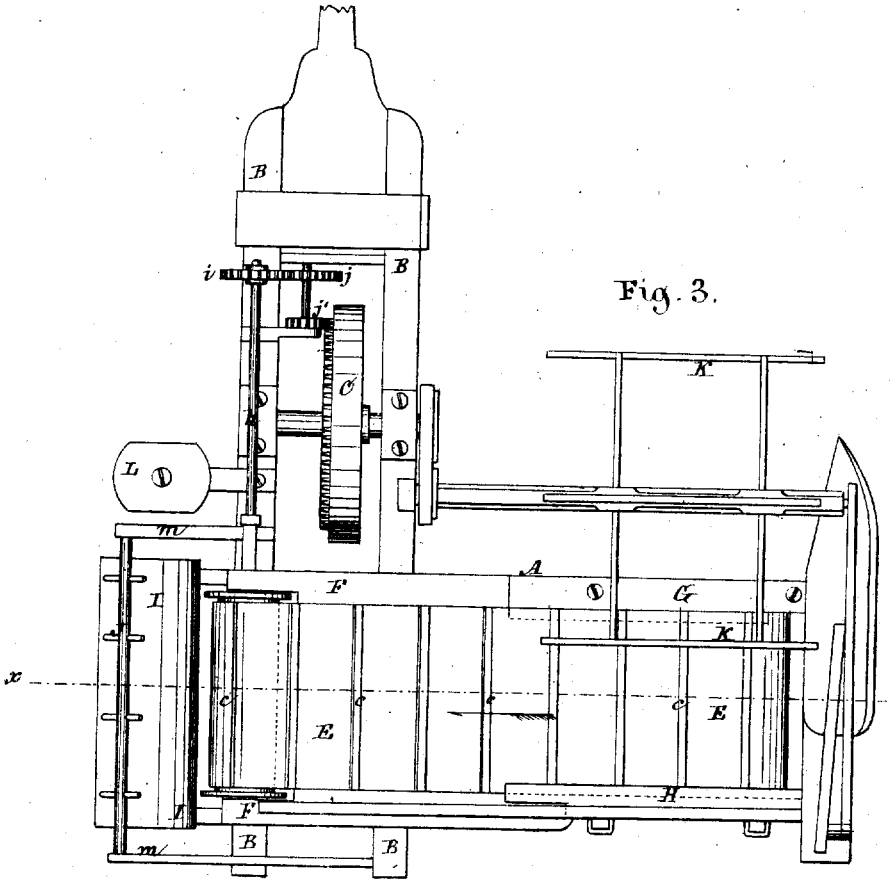
Figure 3 is a plan of the same.

The said improvement relates more particularly to the construction and combination of devices which, in connection with a platform and elevated delivery apparatus, aid materially in carrying off, delivering, and discharging the grain as it is cut in proper form and condition to be conveniently handled and bound into gavels without waste.

The horizontal platform A and main frame B are supported by the driving-wheel C and the carrying or grain-wheel D. The cutting apparatus, (not shown,) of the usual or any known construction, are driven by power communicated from the driving-wheel C by a connecting-rod and crank in the usual way.

To the rear of the driving-wheel C, and supported by the main frame B, is an elevated frame-work, F, the posts of which carry a roller, *b*. The frame F inclines from this roller *b*, on the cutting side of the machine, down to the level of the platform A, at or near the inner end of the cutting apparatus, and at the outer end of the platform is a roller, *a*.

Over the rollers *a b* works the endless apron E, the apron being of sufficient length to extend horizontally along the platform A to a point at or near the heel of the cutting apparatus, thence up the inclined frame F, as shown. A series of cleats, *c*, at suitable distances apart, is secured to the outer surface of the apron E, and a like series, *d*, is secured to its inner surface, the latter, however, terminates at its forward end a little short of the edge of the apron; and on the lower face of the forward end of each is fastened small guiding pieces *e*, which project forward a short distance, so as to form recesses *f* between each guiding piece *e* and the forward edge of the apron.

Along the rear upper edge of the front rail or finger-bar of the platform A, and extending a distance up the inclined frame, is fastened a guiding-plate, G, as shown, the rear edge of which supports the forward edge of the apron E, enters the recess *f*, and guides the forward edge of the apron horizontally along on a plane level with the cutting apparatus, thence up the incline formed by the frame F.

The rear edge of the apron E is at the same time held horizontally, through the corresponding part of its motion, by a guiding plate, H, which is fastened to the rear rail of the platform A, and extending a distance up the inclined frame. The forward edge of the plate H projects over the rear edge of the apron E, so as to hold it horizontal till it ascends the incline formed by the frame F.

The plate H, while it gives the proper direction to the rear edge of the apron, performs also another function, as follows:

The heads of the grain, being heavier than the butts, adhere more closely to the apron, and are apt to start and be carried in advance of the butts, in which case the cut grain is liable to become tangled, so as to make it difficult to gather it into a compact gavel; but, by extending the plate H forward over the rear edge of the apron, as shown, a stationary surface is presented, upon which the heads fall, and by which they are retarded to a partial extent, thereby facilitating the better delivery of the grain.

Motion is communicated from the drive-wheel C to the apron E by means of gearing *i j* and shaft *h* leading to the roller *b*. The roller *b* has recesses *g* in its periphery which receive and engage the cleats *d* of the apron E, so as to make more certain the operation of the apron and the discharge of the grain. But, in lieu of these devices the apron may be driven by other suitable means.

On the outside of the machine, and immediately under the discharging point of the conveying and elevating apron E, there is placed a stationary concave-shaped receiver, I, by preference of metal, and having a continuous smooth even surface, so that the straws may not fall or project through it, in which event it would be impossible to collect the gavels in an even and compact form. The concavity and surface of this receiver is such that it will receive and hold the cut grain as it is delivered by the elevated apron until a sufficient quantity has accumulated to form a gavel, when it is discharged from the machine.

Upon bearings *m m* is placed a revolving rake, J, having two sets of teeth at right angles or nearly so to its axis and projecting in opposite directions to each other, and of sufficient length to reach near to the surface of the concave I, and, as they revolve, each set of teeth serves alternately to hold the grain in the receiver while the gavel is being collected, and to cut off or separate the gavel as it is discharged from the concave I from the grain that is being delivered from the apron E, by which operation the gavels are delivered from the machine with facility and in compact form.

The revolving rake J is operated by an attendant sitting upon the seat L, who, by turning the rake half a revolution, separates the gavel from the grain that is being delivered, and discharges the same from the concave.

The platform, endless conveying and elevating apron, concave receiver, revolving rake, and attendant's seat are all arranged in rear of the center of the driving-wheel, which construction well balances the machine and secures the easy and certain operation of the various parts thereof.

The operation is as follows:

As the machine is drawn forward over the field the grain is cut, and by the aid of the reel, common to most reaping-machines, falls upon the endless apron E, which moves in the direction indicated by the arrows, on a plane level with the cutting apparatus, thence up the inclined plane F; and the cleats *c c* retain the cut grain upon the apron and carry it along and up over the inclined plane, and deliver it, at the side of the machine, into the concave receiver I. The specific gravity of the heads of the cut grain being much greater than that of the butts, except for the plate H, would adhere more closely to the apron and start first in their forward and upward movements, and would be liable to become more or less entangled before it is delivered into the concave receiver, and thus prevent its being collected into an even and compact gavel. But, by allowing the heads to fall upon the surface of the plate H, which extends forward over the rear edge of the apron and does not move with the apron, their forward movement will be somewhat retarded, and by dispensing with a roller or guiding plate over the front edge of the apron and placing the guiding plate G, as shown, under it, with the forward ends of the cleats *c c* as near the cutting apparatus as possible, the cut grain is carried up and delivered in good order for binding.

The grain is delivered by the endless apron into the concave I, where it is retained until a sufficient quantity has accumulated to form a gavel. If the concave had not a continuous surface, but were open or slatted, the straws would fall or project through and become tangled, and in very short grain it would be impossible to collect a gavel. If the receiver were not concave or circular, a revolving rake would not enter it so as to discharge the gavel collected therein. When enough of the cut grain has been delivered into the concave receiver I to form a gavel, a semi-revolution of the rake J throws out that portion, and as the ends of the teeth pass the point M they separate the gavel that is being discharged from the grain that is being delivered into the concave and at the completion of each semi-revolution the rake assists in retaining the grain in the concave, as it continues to be delivered, until another gavel is collected and a like operation is repeated.

Figure 4:
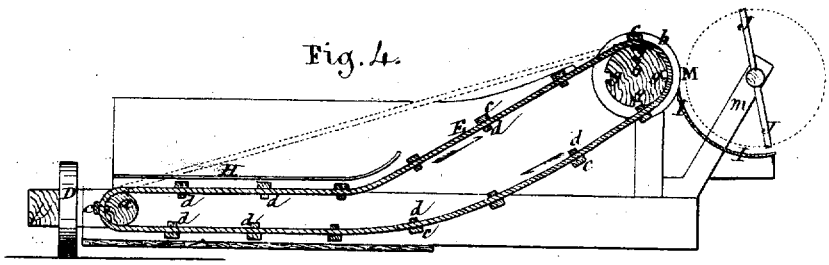
Figure 4 represents a longitudinal vertical section taken through the line *x x* of fig. 3.
Figure 5:
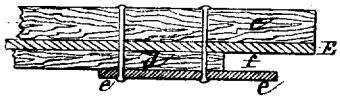
Figures 5 and 6 represent portions of the platform and apron somewhat enlarged, the better to show their construction.
Figure 6:
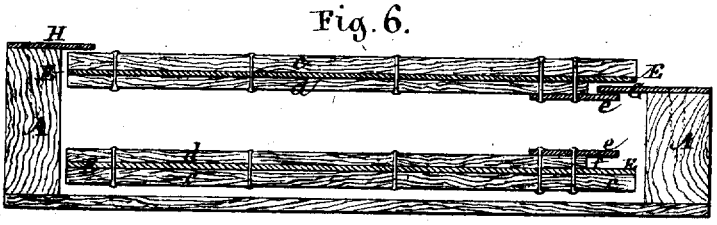

By means of the plates G and H the apron E is kept perfectly in line with the platform A while passing over it, the ends of the cleats *c* passing under the plate H at the back part of the platform, and the inner or rear edge of the guiding plate G at the front side of the platform working or fitting in the recesses *f* between the edge of the apron E and guiding pieces *e*. Were it not for these guiding arrangements, which work free and easy, the apron would assume a position as shown by the dotted lines in fig. 4. If a roller, plate, or other device be placed over the front edge of the apron to preserve its horizontalism during its passage in rear of the cutting apparatus, such roller or other device would be very objectionable, and so obstruct the passage of the cut grain as to defeat its successful operation.

Having thus fully described the invention of the said JACOB J. MANN and HENRY F. MANN,

What is claimed therein as new, and desired to be secured by Letters Patent, is—

1. The guiding plate G arranged upon the front rail or finger-bar, over which the forward edge of the apron E extends, and under which the guiding pieces *e* pass, substantially as and for the purpose described.

2. The bar or plate H at the back of the platform, arranged with its edge above the apron, in combination with the front guiding plate G, having its edge below the apron, substantially as described.

3. In combination with a conveying and elevating apron, having the top and bottom cleats affixed thereon, the recessed roller for giving a positive motion thereto, as and for the purpose described.

4. The stationary concave receiver I, having a continuous surface, arranged as described, at the side of a harvesting-machine having an elevated side delivery, so as to receive the cut grain from the elevating and delivery apparatus, and collect the same into gavels preparatory to their being discharged from the machine.

5. The revolving rake J, in combination with the stationary concave receiver I having a continuos surface, as and for the purpose described.

HENRY F. MANN.

Witnesses:

A. B. STOUGHTON,

EDMUND MASSON.